Patented July 9, 1940

2,207,566

UNITED STATES PATENT OFFICE 2,207,566

METHOD OF TREATING ALKALI METAL HYDROXIDE SOLUTIONS

William F. Waldeck, Wadsworth, and Richard J. Ketterer, Barberton, Ohio, assignors to Pittsburgh Plate Glass Company, Allegheny County, Pa., a corporation of Pennsylvania No Drawing. Application January 21, 1939, Serial No. 252,206

13 Claims. (Cl. 23—184)

This invention relates to a method of improving the color of aqueous solutions of alkali metal hydroxides particularly aqueous solutions of sodium hydroxide. Applicants have observed that commercial caustic soda solutions, particularly those which are prepared by the electrolysis of brine solutions in diaphragm cells, often exhibit a green fluorescence. In general, this objectionable fluorescence does not exist when the caustic is first prepared but it is found to develop upon standing in the daylight. Thus, it occasionally happens that caustic which was colorless when purchased becomes green and fluorescent before use. This fluorescence renders the caustic unsightly and since purchasers of alkali metal hydroxides now demand colorless products, it is often difficult to sell caustic solutions which exhibit this color.

In accordance with our invention, we have found that the color may be removed by treating the sodium hydroxide solution with a suitable oxidizing agent or adsorbent. Thus, the fluorescence may be destroyed or removed by air, oxygen, ozone, sodium hypochlorite, hypochlorous acid, peroxides such as hydrogen, sodium or potassium peroxide or other convenient oxidizing agent or by electrolytic oxidation. Similarly, the fluorescence may be removed by means of a finely divided adsorbent, such as solid alkali metal or alkaline earth carbonates or hydroxides, for example, sodium, calcium or magnesium carbonate or calcium or magnesium hydroxide, or other adsorbents such as active carbon, alpha-cellulose, etc. If desired, oxidation and adsorption may both be used either simultaneously or concurrently to remove the color.

In order to remove the color permanently, it is found necessary to develop the fluorescence, preferably to its maximum intensity prior to treatment of the solution for its removal or destruction. Since the fluorescence does not exist when the caustic is first prepared steps should be taken to activate its development.

The fluorescence may be developed by subjecting the caustic to the action of light waves having a wave length equal to or less than that of daylight. Visible light, such as sunlight or diffuse daylight has been found to be suitable for this purpose. When the caustic is exposed to the action of sunlight on a dark day, the development of fluorescence is relatively slow while when it is exposed on a cloudless day, the development is rapid. Similarly, the rate of development is stimulated by ultra-violet light. In general, light waves having a shorter wave length than that emitted by the fluorescent liquor are suitable, and it is found that the color is most rapidly developed by means of light waves having a wave length of below 5500 Å. The hydroxide is preferably treated as a solution thereof in order to permit a more complete penetration of light rays and a correspondingly more complete development of fluorescence. The temperature of the solution during light exposure may be maintained at any convenient value, generally at room temperature.

The irradiation may be carried out in any convenient manner which permits penetration of the light rays into the solution. Thus, a thin stream of caustic liquor may be flowed over a surface which is exposed to the action of sunlight or to ultra-violet ray lamps and if necessary, the liquor may be recirculated as often as is required to completely or substantially completely develop the color. Numerous other methods of irradiation may be resorted to.

The following examples are illustrative:

Example I

A quantity of electrolytic caustic soda was concentrated to a concentration of 50 percent by weight and was subjected to the action of sunlight for 30 minutes after which time a green fluorescence developed in the solution. The irradiated solution was then aerated for a period of 8 hours. The caustic solution thus produced was colorless and exhibited no fluorescence.

Example II

A quantity of electrolytic caustic was placed under an ultra-violet ray lamp which was capable of emitting a preponderance of light rays having a wave length of 2000 to 4000 Å. After irradiation for 30 minutes, a green fluorescence developed in the solution. This color was removed by introduction of hydrogen peroxide in the proportion of 0.017 pound of hydrogen peroxide per ton of sodium hydroxide.

Example III

A quantity of electrolytic caustic, treated as in Example II, to develop fluorescence was agitated with finely divided limestone in the proportion of 20 pounds of limestone per ton of caustic. The solution after filtering was substantially colorless.

While the process has been described with particular reference to sodium hydroxide solutions, the invention is not so limited but may be applied to the removal of fluorescence from other alkali metal hydroxides, such as potassium or lithium hydroxide. Although the present invention has been described with particular reference to the specific details of certain embodiments thereof, it is not intended that such details shall be regarded as limitations upon the scope of the invention except insofar as included in the accompanying claims.

We claim:

1. The process of removing fluorescence from a fluorescent aqueous alkali metal hydroxide in which the fluorescence has been substantially completely developed which comprises treating said alkali metal hydroxide with sufficient oxidizing agent to remove the fluorescence.

2. The process of removing fluorescent from a fluorescent aqueous alkali metal hydroxide in which the fluorescence has been substantially completely developed which comprises treating said alkali metal hydroxide with sufficient oxygen to remove the fluorescence.

3. The process of removing fluorescence from an aqueous solution of sodium hydroxide in which the fluorescence has been substantially completely developed which comprises treating said hydroxide with sufficient oxidizing agent to remove the fluorescence.

4. The process of removing fluorescence from an aqueous solution of sodium hydroxide in which the fluorescence has been substantially completely developed which comprises treating said hydroxide with sufficient oxygen to remove the fluorescence.

5. The process of preparing a non-fluorescent aqueous alkali metal hydroxide by treatment of an hydroxide which is normally capable of developing fluorescence which comprises treating said hydroxide to substantially completely develop fluorescence therein and then treating with an oxidizing agent to remove the said fluorescence.

6. The process of preparing a non-fluorescent alkali metal hydroxide by treatment of an hydroxide which is normally capable of developing fluorescence which comprises treating said hydroxide to substantially completely develop fluorescence therein and treating with an oxidizing agent and an adsorbent to remove the said fluorescence.

7. The process of preparing a non-fluorescent sodium hydroxide by treatment of an hydroxide which is normally capable of developing fluorescence which comprises treating an aqueous solution of said hydroxide to substantially completely develop fluorescence and oxidizing the fluorescent solution.

8. The process of preparing a non-fluorescent sodium hydroxide by treatment of an hydroxide which is normally capable of developing fluorescence which comprises subjecting an aqueous solution of said hydroxide to the action of ultra-violet light to substantially completely develop fluorescence and oxidizing the fluorescent liquor.

9. The process of preparing a non-fluorescent sodium hydroxide by treatment of an hydroxide which is normally capable of developing fluorescence which comprises subjecting an aqueous solution of said hydroxide to the action of daylight to substantially completely develop fluorescence and oxidizing the fluorescent liquor.

10. The process of preparing a non-fluorescent sodium hydroxide by treatment of an hydroxide which is normally capable of developing fluorescence which comprises subjecting an aqueous solution of said hydroxide to the action of light rays having a wave length less than 5500 Å. to substantially completely develop fluorescence and oxidizing the fluorescent liquor.

11. The process of preparing a non-fluorescent sodium hydroxide by treatment of an hydroxide which is normally capable of developing fluorescence which comprises subjecting an aqueous solution of said hydroxide to the action of light rays having a wave length less than that which is emitted by the fluorescent liquor to substantially completely develop fluorescence and oxidizing the fluorescent liquor.

12. The process of preparing a non-fluorescent aqueous sodium hydroxide by treatment of an hydroxide which is normally capable of developing fluorescence which comprises subjecting an aqueous solution of said hydroxide to the action of light rays having a wave length less than that emitted by the fluorescent liquor to substantially completely develop fluorescence and removing the fluorescence by treating the solution with an adsorbent.

13. The process of preparing a non-fluorescent sodium hydroxide by treatment of a hydroxide which is normally capable of developing fluorescence which comprises subjecting an aqueous solution of said hydroxide to the action of light rays having a wave length less than 5500 Å. to substantially completely develop fluorescence and removing the fluorescence from the solution by treating the solution with an adsorbent.

RICHARD J. KETTERER.
WILLIAM F. WALDECK.